T. F. GLENN.
ARTIFICIAL TOOTH.
APPLICATION FILED JAN. 24, 1916.

1,212,935.

Patented Jan. 16, 1917.
2 SHEETS—SHEET 1.

Inventor
Thomas F. Glenn,

Witness
By
Attorney

T. F. GLENN.
ARTIFICIAL TOOTH.
APPLICATION FILED JAN. 24, 1916.
1,212,935.
Patented Jan. 16, 1917.
2 SHEETS—SHEET 2.
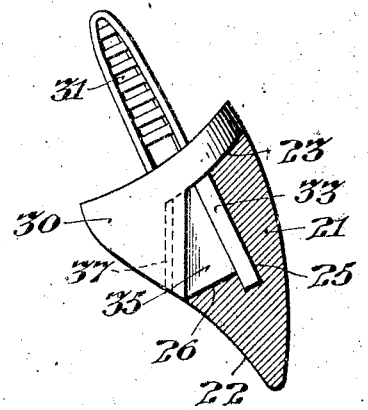
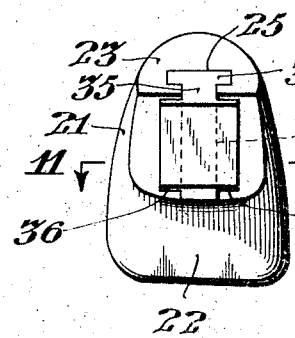
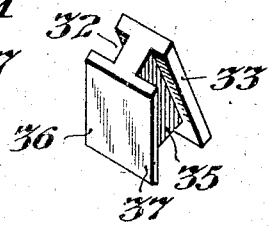
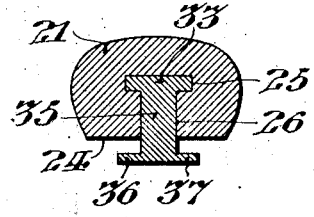
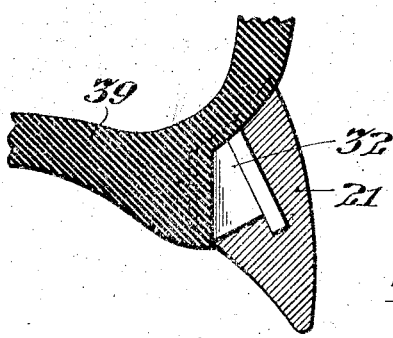
Witness
Robmin L Vail
Inventor
Thomas F. Glenn,
By Clifton C. Callwell
Attorney

UNITED STATES PATENT OFFICE.

THOMAS F. GLENN, OF ARDMORE, PENNSYLVANIA.

ARTIFICIAL TOOTH.

1,212,935.  Specification of Letters Patent.  Patented Jan. 16, 1917.

Application filed January 24, 1916. Serial No. 73,770.

*To all whom it may concern:*

Be it known that I, THOMAS F. GLENN, a citizen of the United States, and a resident of Ardmore, county of Montgomery, State of Pennsylvania, have invented certain new and useful Improvements in Artificial Teeth, of which the following is a specification, reference being had to the accompanying drawings.

My invention relates particularly to that class of artificial teeth that are interchangeable or that may be replaced and is especially directed to the means whereby such interchangeability is attained.

The principal objects of my invention are, to provide an artificial tooth which combines esthetic principles with such novel formations and characteristics as render it capable of universal employment, and applicable to the variety of needs common to the dental profession.

Other objects of my invention are, to provide an artificial tooth which may be as readily employed in vulcanite mountings as in crown and bridge operations, and which will not only afford greater retaining strength when connected with a vulcanite mounting than the well-known pin teeth, but which will tend to reduce the cost of mounting when employed in crown and bridge operations, and be interchangeable or replaceable in any form of mounting with which it may be employed.

Specifically stated, the form of my invention hereinafter described comprises a tooth having a natural bite surface, a relatively angular lingual surface extending longitudinally therefrom toward the gingival end, an undercut recess in said lingual surface approximating said bite surface and extending gingivally through the tooth and affording an elongated restricted lingual opening therein, and an anchor member engaged in the recess and comprising a backing overlying the said lingual surface exclusive of the bite.

My invention also includes all of the various novel features of construction and arrangement hereinafter more definitely specified.

Figure 1:
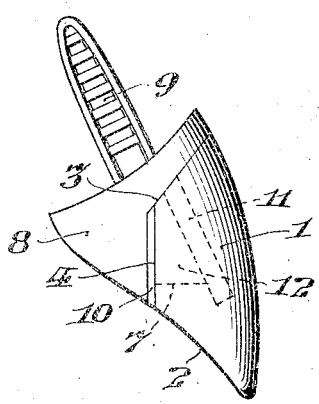
Figure 2:
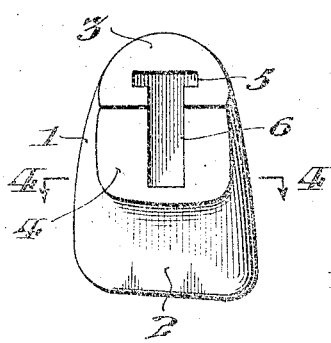
Figure 3:
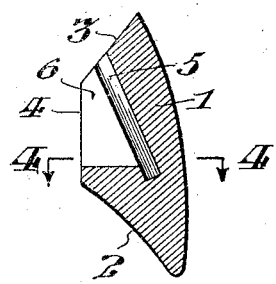
Figure 4:
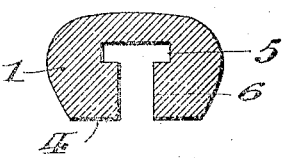
Figure 5:
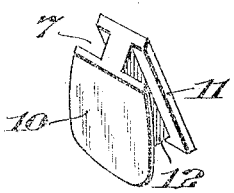
Figure 6:
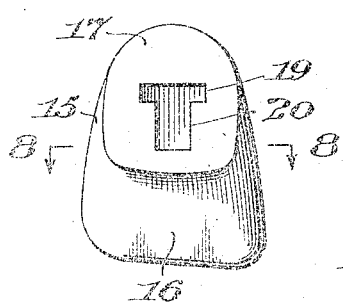
Figure 7:
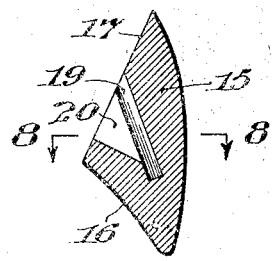
Figure 8:
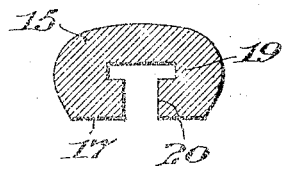

In the accompanying drawings, Figure 1 is a side elevational view of a tooth constructed in accordance with my invention, showing its convenient adaptation to a mounting such as may be connected with the root of a natural tooth; Fig. 2 is a rear elevational view of the tooth shown in Fig 1, *per se;* Fig. 3 is a central vertical longitudinal sectional view of said tooth; Fig. 4 is a transverse sectional view taken on the lines 4—4 in Figs. 2 and 3; Fig. 5 is a perspective view of the attaching anchor shown in Fig. 1, *per se;* Fig. 6 is a rear elevational view of a slightly modified form of tooth having the general characteristics of the tooth shown in Fig. 1; Fig. 7 is a central longitudinal sectional view of the tooth shown in Fig. 6; Fig. 8 is a transverse sectional view of said tooth taken on the line 8—8 in Fig. 7; Fig. 9 is a central vertical longitudinal sectional view of a tooth such as is shown in Fig. 1, connected with a similar mounting shown in elevation, by an attaching anchor of slightly modified construction; Fig. 10 is a rear elevational view of the tooth and anchor shown in Fig. 9; Fig. 11 is a transverse sectional view of said tooth and anchor taken on the line 11—11 in Fig. 10; Fig. 12 is a perspective view of said attaching anchor; and Fig. 13 is a sectional view showing the tooth engaged with a vulcanite plate by an attaching anchor of the form shown in Fig. 12, and being shown in elevation in Fig. 13 for convenience of illustration.

In the form of my invention shown in Figs. 1 to 5, inclusive, the tooth body 1 comprises the "bite" 2, which is curved and preferably of irregular formation, simulating a natural human tooth, a "ridge-lap" 3, and a plane longitudinal surface forming the "shut" 4, intersecting said "bite" at its linguo-gingival termination and intersecting said "ridge-lap" at its linguo-incisive termination.

The tooth body 1 is provided with an undercut retaining recess 5, which extends into the tooth body through the gingival surface or "ridge-lap" 3, and which is connected with a relatively narrow slot 6 opening through the lingual wall or "shut" 4, as shown in Figs. 2, 3 and 4.

As shown in Fig. 1, the tooth body 1 may be conveniently employed as an interchangeable tooth, and may be readily connected by the anchor member 7 with the mounting 8, which in the form shown in Fig. 1 is provided with a pin or post 9 for engagement with a natural tooth root, although said mounting may be of any other form. The anchor member 7 comprises the flat backing plate 10, which preferably conforms to the plane surface 4 forming the "shut" and preferably terminates at the linguo-gingival edge of the "bite" 2, and which is provided with a tongue 11 arra'ged to be engaged in the recess 5 and connected with said plate 10 by a relatively narrow web 12 extending through the slot 6. In this embodiment of my invention it is highly essential that the "shut" surface 4 be trued to a perfect plane in definite relation to the recess 5, so that the backing will be drawn into close relation thereto by the tongue 11 as it enters the recess 5, as shown in Fig. 1.

In the form of my invention shown in Figs. 6 to 8, inclusive, the tooth body 15 comprises the "bite" 16 which is curved and preferably of irregular formation, simulating nature, and a lingual plane surface forming the "ridge-lap" 17 extending from the gingival end of the tooth incisively and intersecting said "bite" 16 at its linguo-gingival termination. In this form of my invention the retaining undercut recess 19 and the relatively narrow slot 20 extend into the tooth body toward the incisive end thereof through the "ridge-lap" 17, and naturally the backing employed with such tooth will overlie said "ridge-lap" and have its incisively directed edge terminating free of the "bite."

In the form of my invention shown in Figs. 9 to 12, inclusive, the tooth structure is substantially identical with the tooth structure shown in Figs. 1 to 4, inclusive, and comprises the tooth body 21, the natural "bite" 22, the "ridge-lap" 23, the "shut" 24, the recess 25, and the relatively narrow slot 26, respectively corresponding to the similar parts 1, 2, 3, 4, 5 and 6 shown in Figs. 2 and 3 and described in connection therewith.

As shown in Fig. 9, the tooth body 21 may be conveniently employed in connection with a cast mounting 30, which may have the pin or post 31 if desired, and is connected therewith by the anchor member 32 having the tongue 33 engaged in the recess 25 and connected by the relatively narrow web 35 extending through the slot 26 beyond the lingual "shut" surface 24 of the tooth, with the plate having the lateral flanges 36 and 37 disposed in spaced relation to said "shut" surface 24, but preferably parallel therewith. The mounting 30 may be produced by first placing the anchor member 32 in the tooth, then building up the mounting in wax around the flanges 36 and 37 and in the space between said flanges and the lingual face of said tooth, investing the pattern thus formed, melting the wax and casting in a manner well known to dental practitioners.

In Fig. 13 the tooth 21 and the anchor member 32 are shown embodied in a vulcanite mounting in the form of a mouth plate 39, only a fragment of which is shown for convenience of illustration. In this application of my invention the anchor member 32 may preferably be secured in the tooth body 21 as an integral structure therewith, prior to its being mounted in the vulcanite plate. It is obvious, however, that by reason of its form the tooth body 21 may, if shattered, be replaced by another tooth without mutilating the vulcanite plate in which it is mounted.

It will be obvious that a tooth constructed in accordance with my invention may be universally employed, and is advantageous in that it is not only esthetic, having the natural unshielded "bite," but has the desired strength, as the supporting attachment anchor member has both the tongue, which enters the tooth structure, and the flanges, which are embedded in the mounting extending in the direction most suitable to withstand the greatest stresses and shocks.

It is to be understood that although I have shown the recess as inclining with respect to the axis of the tooth, it may be disposed substantially parallel therewith and with the "shut" surface, and therefore I do not desire to limit my invention to the precise details of construction and arrangement herein specified, as it is obvious that various modifications may be made therein without departing from the essential features of my invention as defined in the appended claims.

Having thus described my invention, I claim:

1. An artificial tooth having in its lingual face a "bite" surface of natural irregular formation, a surface adjoining said "bite" surface extending gingivally therefrom and in oblique relation thereto, and an undercut recess in the surface adjoining said "bite" extending continuously from near said "bite" gingivally, and providing a lingual opening in the form of a relatively narrow slot.

2. An artificial tooth having in its lingual face a "bite" surface of natural irregular formation, a surface adjoining said "bite" surface extending gingivally therefrom in oblique relation thereto, and a recess in said lingual face, approximating said "bite" surface and extending gingivally through said tooth and affording an elongated lingual opening therein.

3. The combination with an artificial tooth having a "bite" surface of natural irregular formation, a surface disposed longitudinally and extending gingivally from the linguo-gingival termination of said "bite" in relatively oblique relation thereto, and an undercut recess approximating said "bite" surface and extending gingivally through the tooth and affording an elongated lingual opening therein, of an anchor member engaged in said recess and extended through said opening and having means providing a backing overlying the lingual face of said tooth, exclusive of the "bite."

4. The combination with an artificial tooth having a "bite" surface, of natural irregular formation, a surface disposed longitudinally and extending gingivally from the linguo-gingival termination of said "bite" in relatively oblique relation thereto, and an undercut recess approximating said "bite" surface and extending gingivally through the tooth and affording an elongated lingual opening therein, of an anchor member engaged in said recess and extended through said opening lingually beyond the lingual plane of said tooth.

5. The combination with an artificial tooth having a natural irregular "bite" surface, a "ridge-lap" surface, a plane "shut" surface extending longitudinally and intersecting said "bite" and "ridge-lap," and an undercut recess approximating said "bite" surface and extending gingivally through the tooth and providing an elongated opening in said "shut," terminating in a relatively broader opening in the "ridge-lap," of a backing comprising a plate overlying said "shut" and having a projection substantially conforming to said recess.

6. The combination with an artificial tooth having a natural irregular "bite" surface, a lingual surface extending gingivally from said "bite" surface in relatively oblique relation therewith, and a recess in said lingual surface, of an anchor member secured in said recess and lingually protruding therefrom beyond said lingual surface.

7. The combination with an artificial tooth having a natural irregular "bite" surface, a lingual surface extending gingivally from said "bite" surface in relatively oblique relation therewith, and a recess in said lingual surface, of an anchor member secured in said recess and lingually protruding therefrom beyond said lingual surface, and having means extending longitudinally of said tooth for engagement with a suitable mounting.

8. The combination with an artificial tooth having a natural irregular "bite" surface, a lingual surface extending gingivally from said "bite" surface in relatively oblique relation therewith, and a recess in said lingual surface, of an anchor member secured in said recess and lingually protruding therefrom beyond said lingual surface, and having flanges spaced from said lingual surface and extending longitudinally with respect to said tooth.

9. An artificial tooth having a natural "bite" surface, intersected by a plane surface in which an elongated recess extends longitudinally.

In witness whereof, I have hereunto set my hand this 21st day of January, A. D., 1916.

THOMAS F. GLENN.

Witnesses:
ROBINSON L. VALL,
R. S. OMERY.